April 5, 1949. S. T. FARRELL ET AL 2,466,219
GUN MOUNT
Filed March 31, 1944 9 Sheets-Sheet 1

April 5, 1949.                S. T. FARRELL ET AL                2,466,219
                                  GUN MOUNT
Filed March 31, 1944                                      9 Sheets-Sheet 3

Inventors:
Sydney T. Farrell
Frederick T. Farrell,
by J. H. McCready,
Attorney.

April 5, 1949.　　　S. T. FARRELL ET AL　　　2,466,219
GUN MOUNT
Filed March 31, 1944　　　9 Sheets-Sheet 4
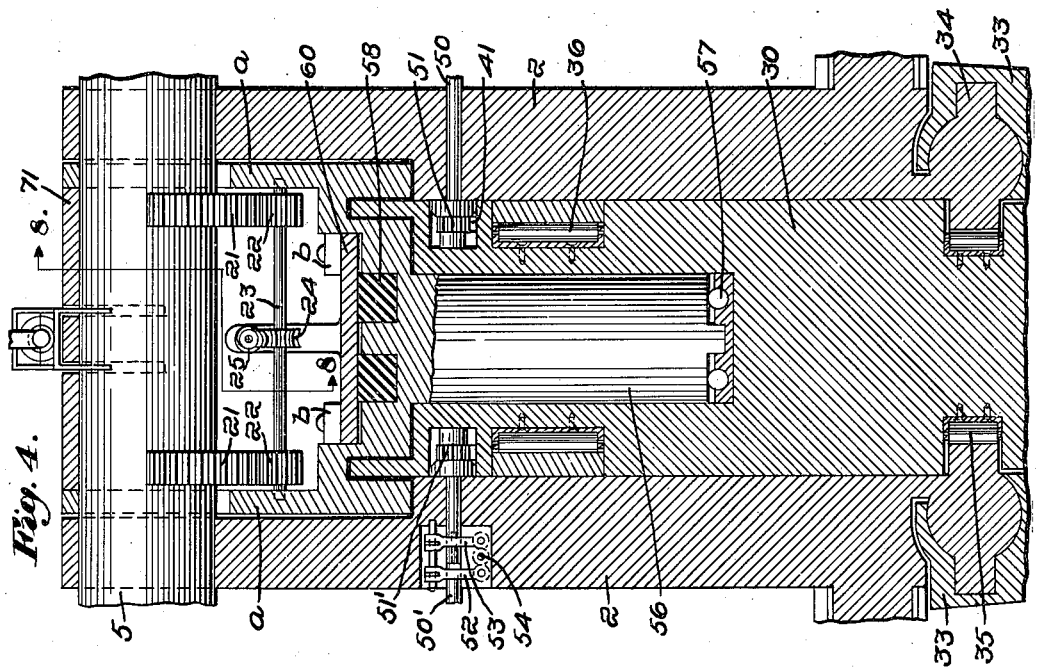
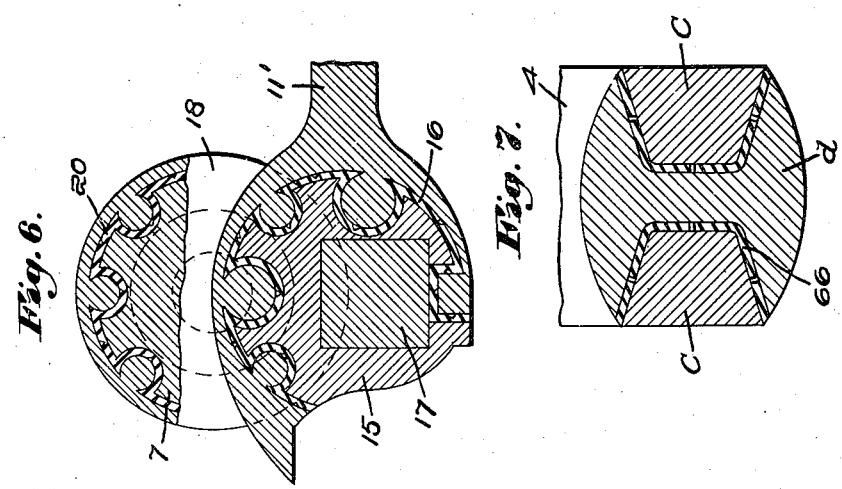
Inventors:
Sydney T. Farrell
Frederick L. Farrell,
by J. H. McCrady,
Attorney.

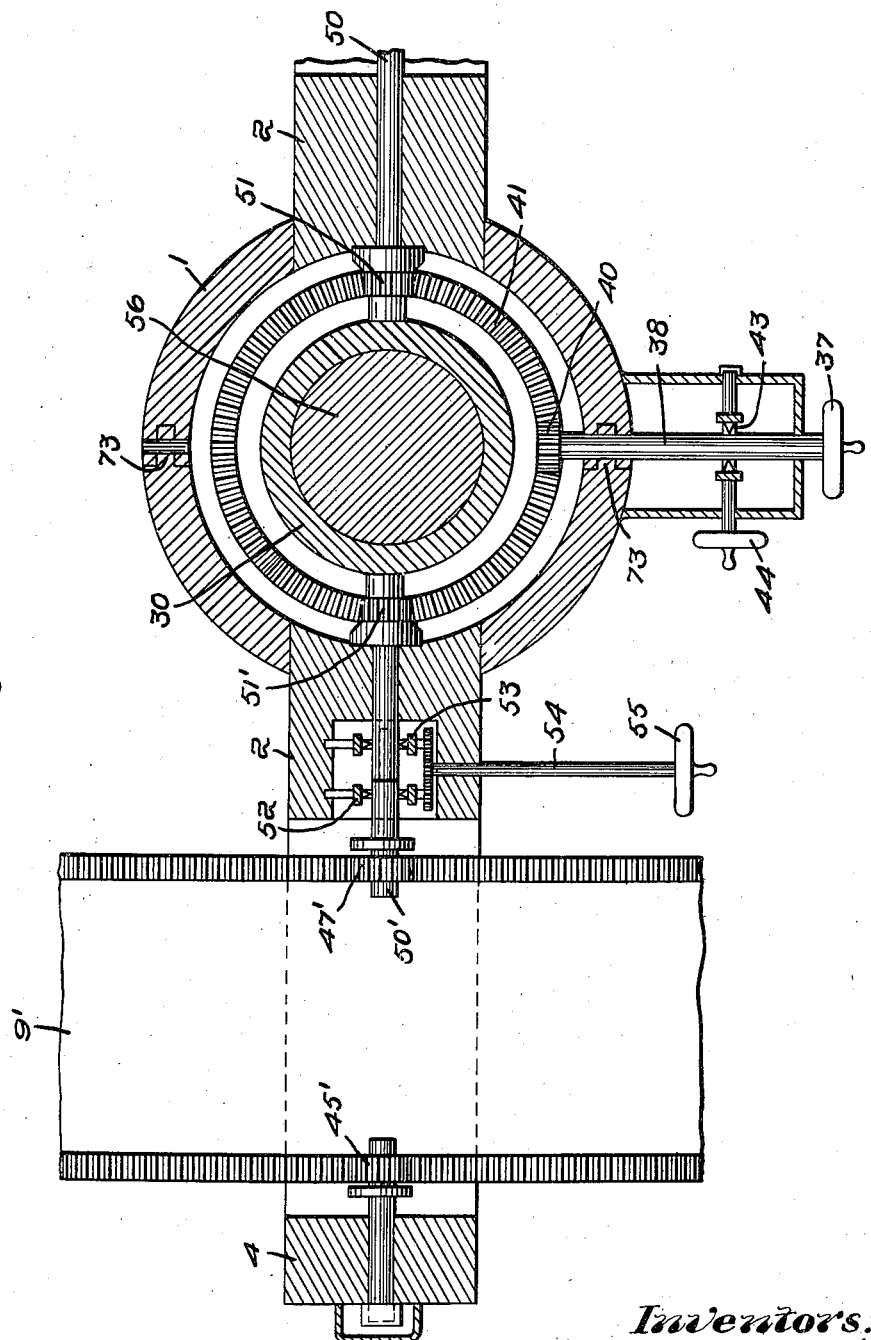

April 5, 1949. S. T. FARRELL ET AL 2,466,219
GUN MOUNT
Filed March 31, 1944 9 Sheets-Sheet 6
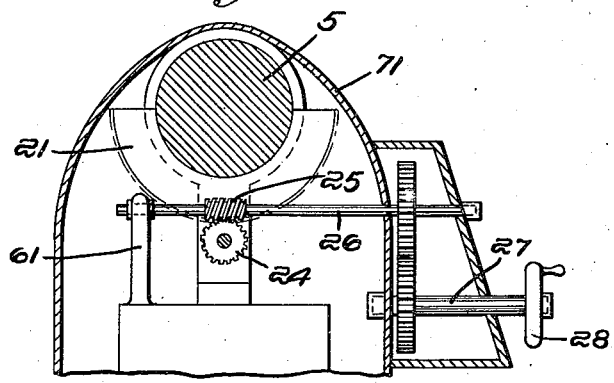
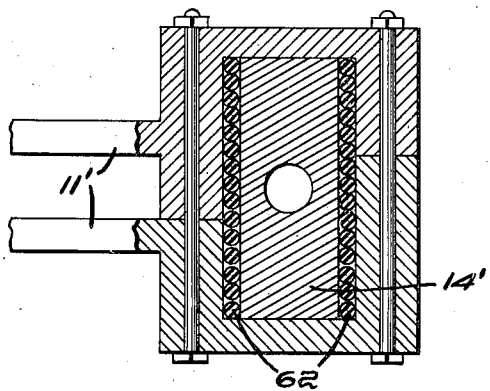
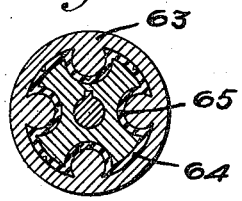
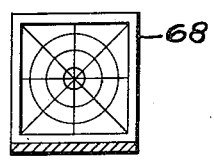
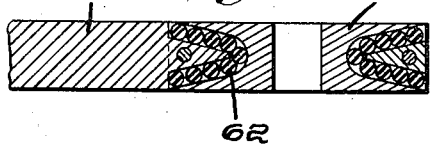
Inventors:
Sydney T. Farrell and
Frederick L. Farrell,
by J. H. McCready,
Attorney.

April 5, 1949. S. T. FARRELL ET AL 2,466,219
GUN MOUNT
Filed March 31, 1944. 9 Sheets-Sheet 7

Inventors:
Sydney T. Farrell
and
Frederick L. Farrell,
by J. H. McCready,
Attorney.

April 5, 1949.   S. T. FARRELL ET AL   2,466,219
GUN MOUNT
Filed March 31, 1944   9 Sheets-Sheet 8
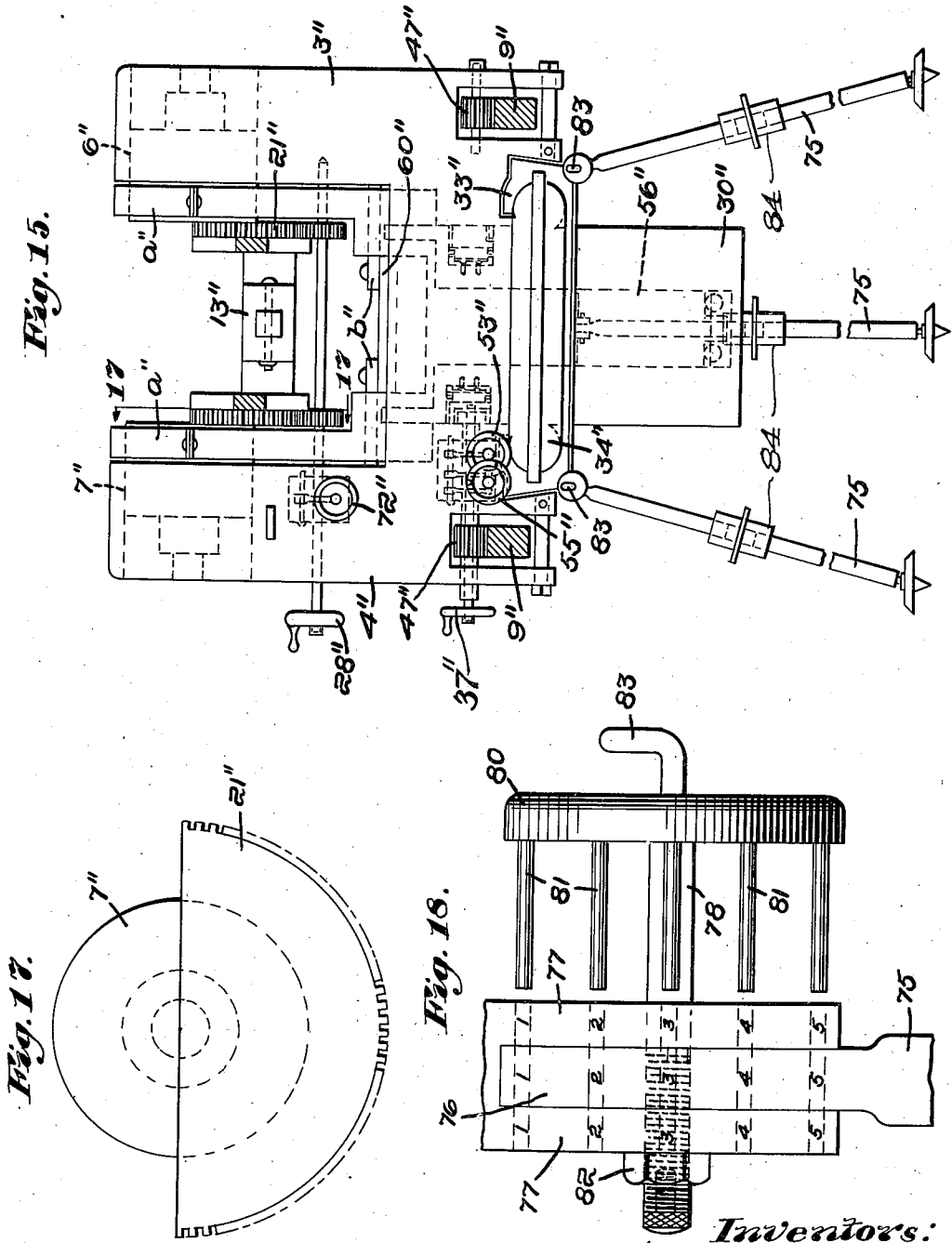
Inventors:
Sydney T. Farrell
Frederick L. Farrell
by J. H. McCready
Attorney.

April 5, 1949.  S. T. FARRELL ET AL  2,466,219
GUN MOUNT
Filed March 31, 1944  9 Sheets-Sheet 9

Inventors:
Sydney T. Farrell
Frederick L. Farrell,
by
Attorney.

Patented Apr. 5, 1949

2,466,219

UNITED STATES PATENT OFFICE 2,466,219

GUN MOUNT

Sydney T. Farrell and Frederick L. Farrell, Belmont, Mass.

Application March 31, 1944, Serial No. 528,876

1 Claim. (Cl. 89—37)

This invention relates to the mounts or supporting means for machine guns, rocket launchers, and the like. It aims to improve equipment of this type with a view to reducing the objectionable effects of recoil, both on the gunner and also on the gun mount itself, and to accomplish this object not only by cushioning the recoil, but also by improvements in the relationship of the gun to the parts in which it is supported. It is a further object of the invention to devise a gun mount in which the gun or guns supported in it can be elevated through a vertical angle of exceptionally large magnitude.

The nature of the invention will be readily understood from the following description when read in connection with the accompanying drawings, and the novel features will be particularly pointed out in the appended claim.

In the drawings,

Fig. 4 is a vertical, sectional view of the central portion of the mount illustrated in Figs. 1, 2 and 3;

Fig. 5 is a horizontal, sectional view taken approximately on the line 5—5, Fig. 3;

Figure 1:
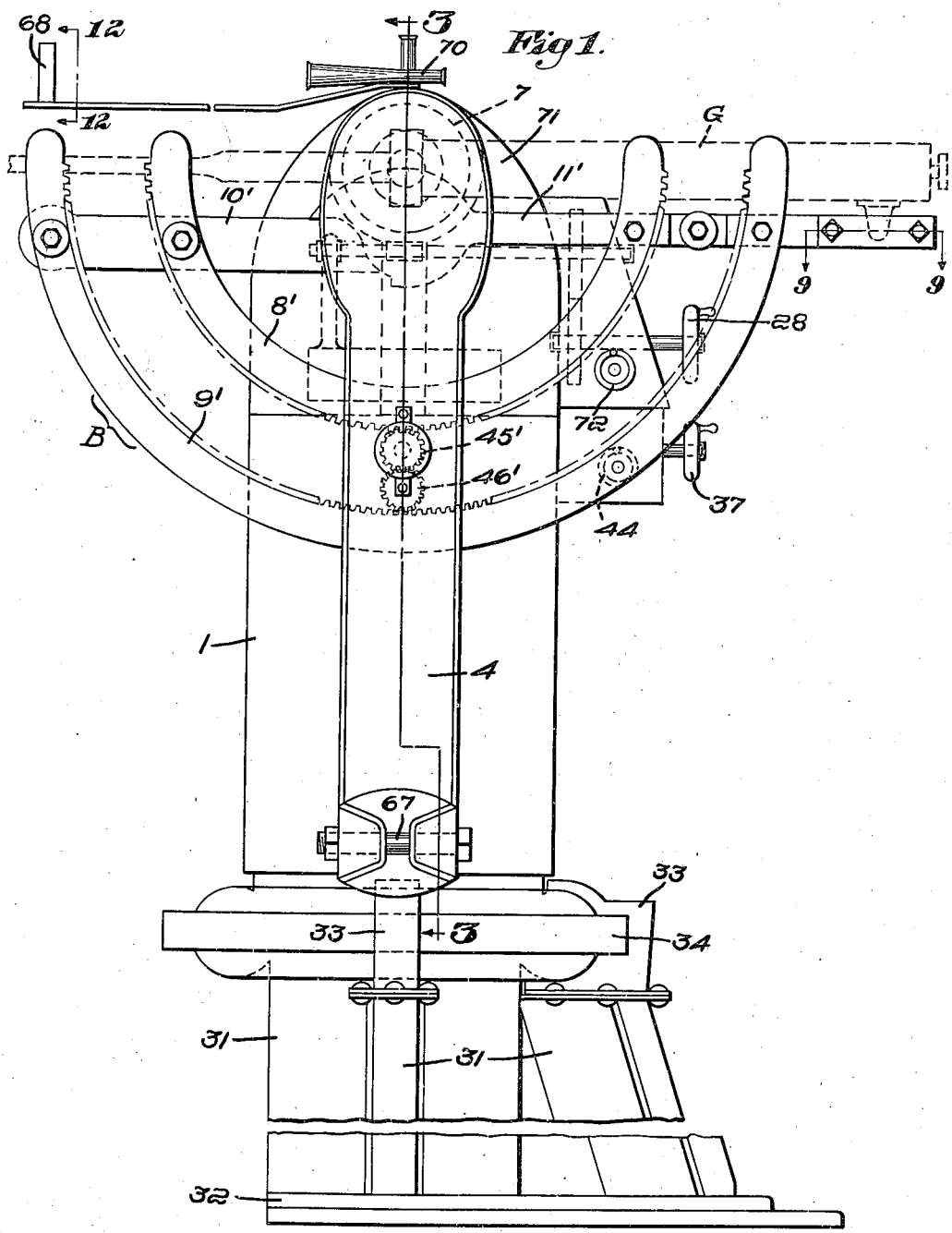
Fig. 1 is an end elevation of a gun mount constructed in accordance with this invention.
Figure 2:
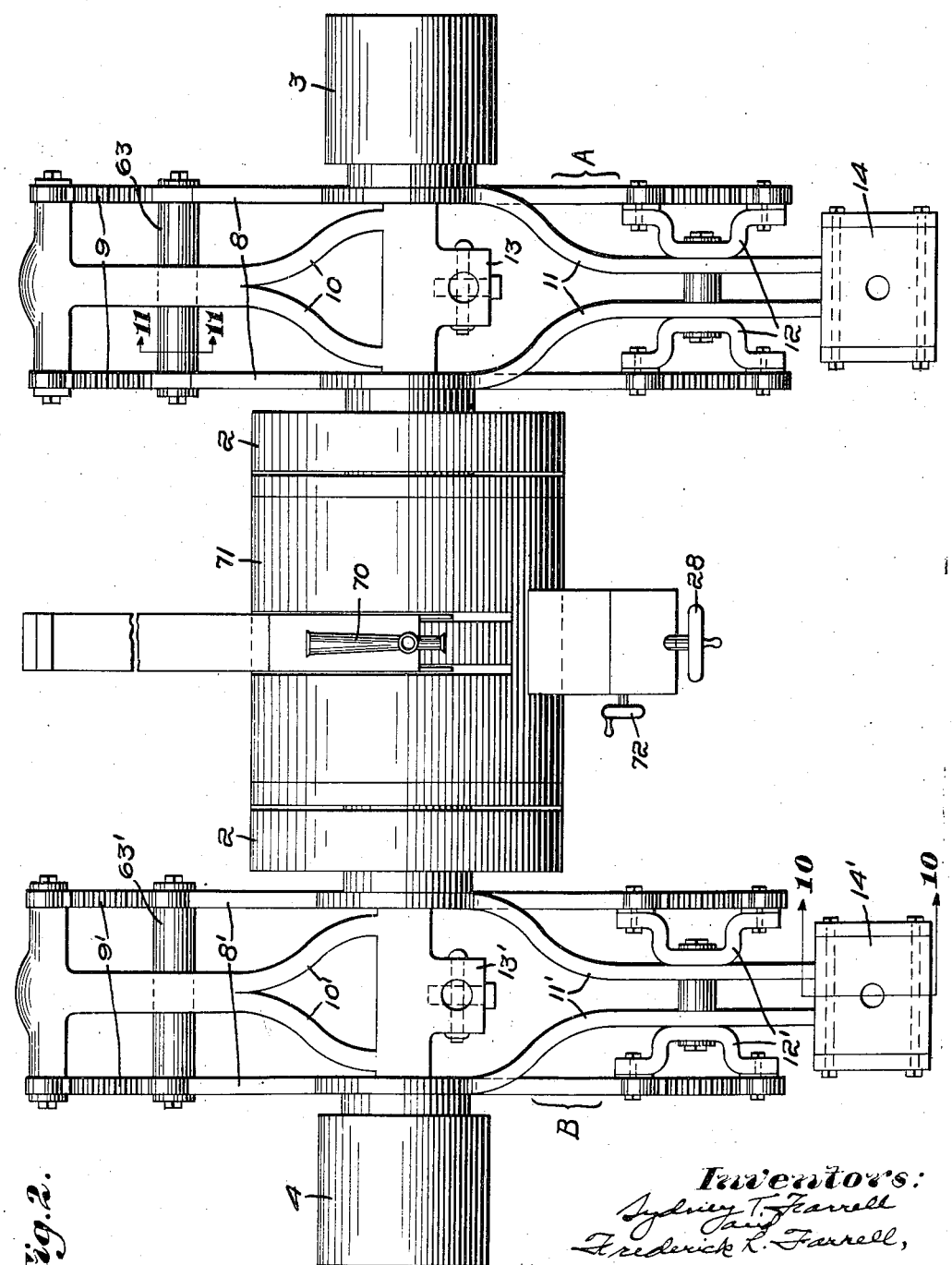
Fig. 2 is a plan view of the mount shown in Fig. 1.
Figure 3:
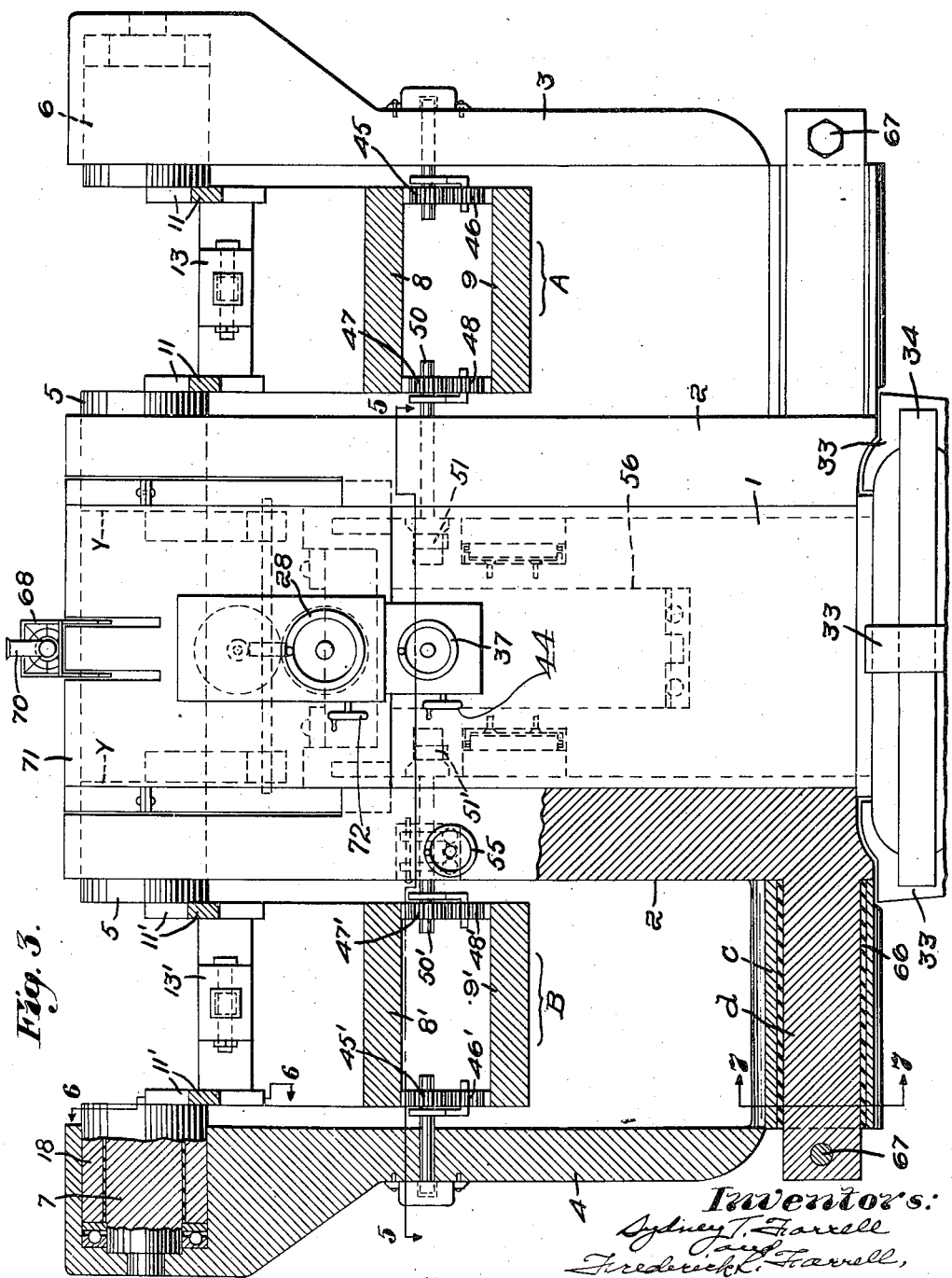
Fig. 3 is a rear elevation of the upper part of the mount shown in Fig. 1, with some parts shown in section.
Figure 13:
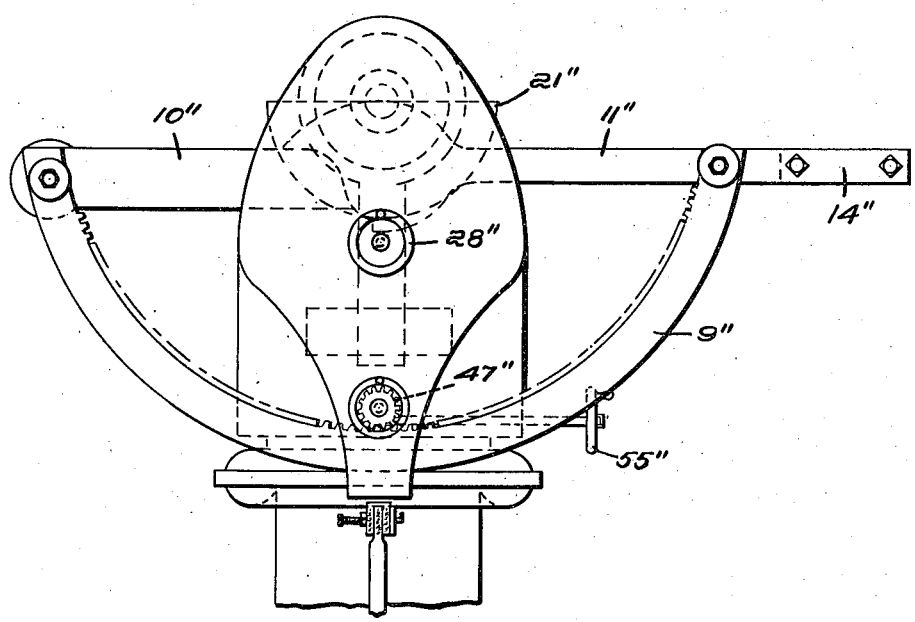
Figure 14:
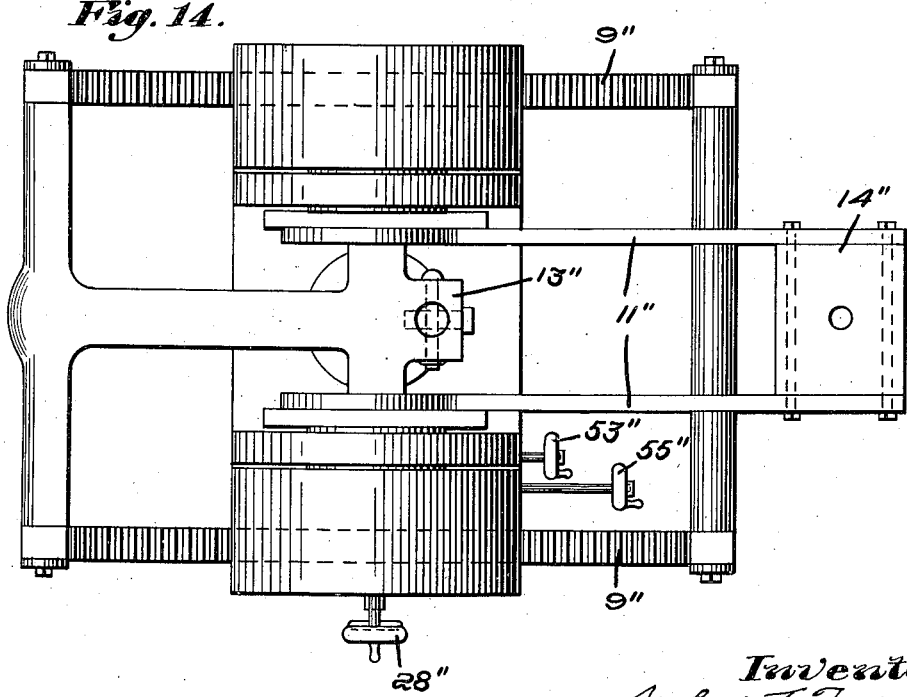
Figure 16:
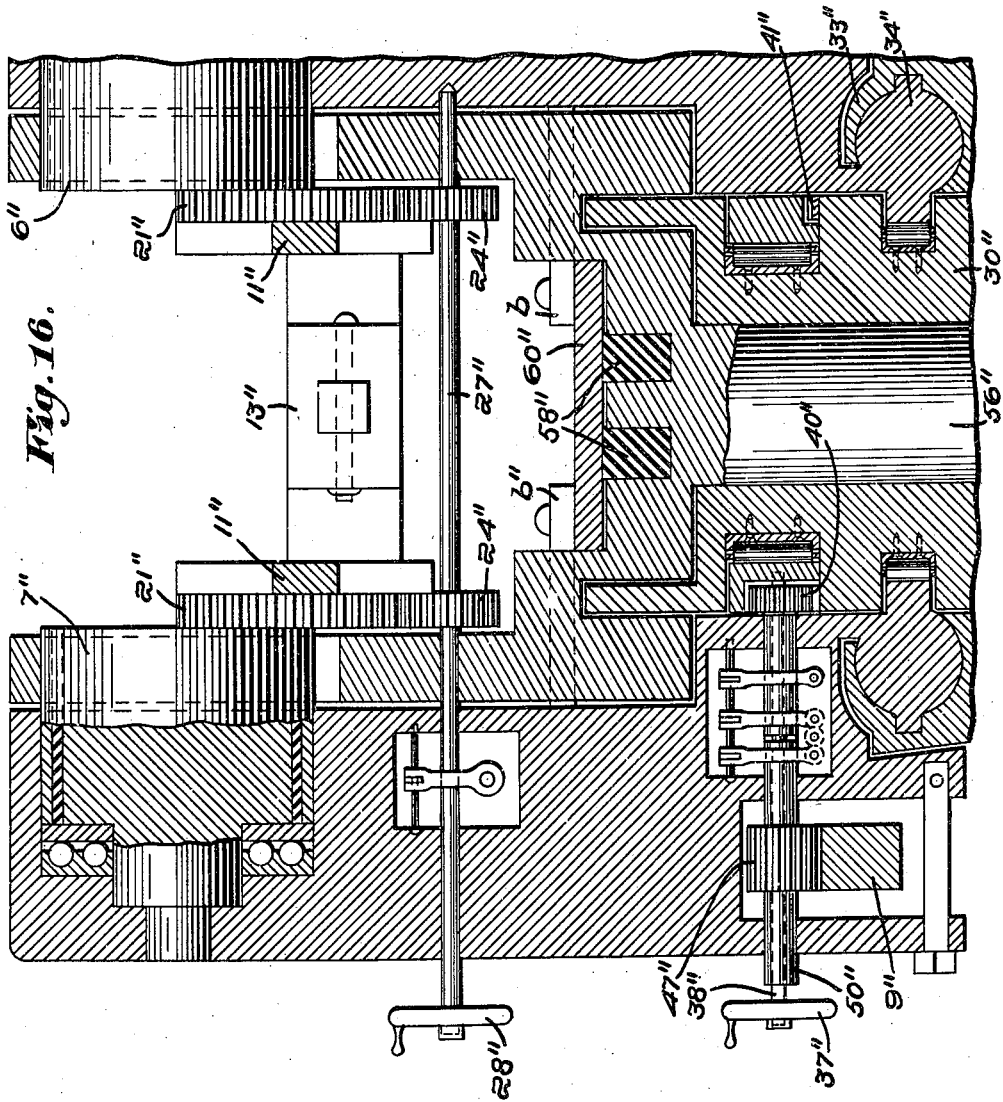

Figs. 6 and 7 are vertical, sectional views taken on the lines 6—6 and 7—7, respectively, of Fig. 3;

Fig. 8 is a sectional view on the line 8—8 of Fig. 4;

Figs. 9 and 10 are sectional views taken on the lines 9—9, Fig. 1, and 10—10, Fig. 2, respectively;

Fig. 11 is a similar view taken on the line 11—11, Fig. 2;

Fig. 12 is a sectional view on the line 12—12, Fig. 1;

Figs. 13 and 14 are end and plan views, respectively, of another form of gun mount embodying features of this invention;

Fig. 15 is a rear elevation, with some parts in section, of the construction shown in Figs. 13 and 14;

Fig. 16 is a vertical, sectional view of the main body of the mount illustrated in Fig. 15;

Fig. 17 is a sectional view taken on the line 17—17, of Fig. 15; and

Fig. 18 is an edge view of a lock for the tripod shown in Fig. 15.

Referring first to Figs. 2 and 3, it will be seen that the mount there illustrated is of the twin or duplex type comprising two holders indicated at A and B, respectively, each adapted to support a machine gun and both being mounted on a common support for adjustment in unison. The supporting mechanism comprises a cylindrical body 1 having trunnions or lateral supports 2—2 at opposite sides of it and either made integral therewith, or they may be made separately for manufacturing convenience, and thereafter joined rigidly to the body by welding, riveting, or in any other convenient manner. Additional trunions or side supports 3 and 4 are positioned outside the trunnion supports 2—2, in line with the latter, and are rigidly connected to the latter. The holders A and B are mounted respectively, between the two pairs of trunnion supports on rock shafts including a central section 5 supported in the center trunnion supports 2—2 and additional sections 6 and 7, respectively, mounted in the side trunnion supports 3 and 4, all three sections having a common axis. Each of these holders consists of a fabricated cradle-like structure including upper and lower semi-circular side pieces indicated at 8 and 9, respectively, in the righthand holder A, Fig. 3, and at 8' and 9', respectively, in the left-hand holder, and these members are bolted, welded, or otherwise rigidly secured to additional longitudinally extending structural pieces 10 and 11, Fig. 2 and to braces 12 to form a rigid holder provided with seats or rests 13 and 14 on which a machine gun can be clamped.

These cradles or holders are suspended from the rock shaft, including the members 5, 6 and 7. Referring to the left-hand cradle B, as shown in Figs. 2 and 3, it will be seen that the parts 11' terminate in arms which are secured, respectively, to the adjacent ends of the pivot rolls 5 and 7. Preferably this securing operation is accomplished by the construction best shown in Fig. 6, from which it will be seen that the part 11' has an enlarged end which partly encircles an inner member 15, the latter being scalloped and the former shaped correspondingly to provide a corrugated space between them for the reception of a cushioning member 16 which isolates the part 11' from the part 15. The latter fits snugly around a square end section 17 of the seat 13' and this part is welded or otherwise secured rigidly to the end portion of a shell 18 carried by the pivot shaft 7, Figs. 3 and 6. These two parts 7 and 18 also are isolated from each other by the layer 20 of cushioning material which separates them in radial directions, while still keying them together so that they must rotate in unison.

The same construction is provided to secure the other arm 11' of the cradle B to the shaft 5. Also, the cradle A at the right-hand side of the mount is secured to the pivot shafts 5 and 6 in the same manner as is the cradle B, and the end sections of the shaft 5 are made like the pivot shaft 7.

It should be observed that this mounting provides an underslung support for the gun, and the supporting surfaces of the cradle are so positioned with reference to the pivotal axis on which the cradle swings, that the axis of the gun will substantially intersect said pivotal axis.

In order to adjust the gun holders or cradles around the pivotal axis on which they are mounted, the shaft 5 has two gear segments 21—21, Figs. 4 and 8, secured rigidly to it, and these segments mesh, respectively, with pinions 22—22, both secured on a shaft 23 and having a worm gear 24 fast thereon meshing with a worm 25 on a shaft 26. As shown in Fig. 8 this shaft is geared to another shaft 27 carrying a hand wheel 28, Figs. 3 and 8, which is located at the front of the main body 1 of the mount. Consequently, by revolving this hand wheel both cradles, together with the guns supported in them, can be adjusted for elevation.

In order to provide for training of the guns, the body 1 is mounted to revolve around a stationary, cylindrical, central post 30, Fig. 4, which rests on, and is secured to, three flanges 31, Fig. 1, forming parts of a pedestal which, together with a base 32, supports the entire weight of the rotative assembly. Also, this pedestal carries several caps or brackets 33 in which an annular bearing member 34, rigid with the lower ends of the trunnions 2—2, as shown in Fig. 4, is mounted to revolve about the axis of post 30. This bearing member 34 is split diametrically into two sections which are secured, respectively, to the trunnions 2—2, or are made integral with them. Preferably roller bearings, such as those shown at 35 in Fig. 4, are interposed between the parts 2 and 30 to facilitate rotation of the body and an additional set of roller bearings 36, Fig. 4, assists in this operation.

The adjusting movement itself may be performed by revolving a hand wheel 37 located immediately below the hand wheel 28, Figs. 1, 3 and 5, and secured fast on a shaft 38, Fig. 5, having a pinion 40 secured rigidly to its inner end. This pinion meshes with a circular rack 41 set into a recess in the post 30, as shown in Fig. 4, and rigidly secured thereto.

However, this assembly of parts which revolves around the central post 30 is intended to be sufficiently free-running so that it can be swung readily by hand. It will be necessary to lock it securely to the post at times, and this may be done by arranging a brake mechanism like that shown in our copending application Ser. No. 498,300, filed August 12, 1943, to clamp the shaft 38 against rotation. Such a brake mechanism is shown in Fig. 5 at 43 and it comprises a worm arranged to be revolved by the hand wheel 44 and serving to draw brake shoes firmly into contact with opposite sides of the shaft 38 where it will clamp this shaft against rotative movement and, consequently, will lock the body 1 in a stationary position. A brake mechanism is not necessary on the shaft 26 because the worm and worm gear operated by them is irreversible. That is, it cannot be reversed by force supplied through the driven or adjusted element. In fact, this is the usual reason for employing an adjusting mechanism of this type.

It may be found desirable to provide some steadying means for the middle portions of the cradles or gun holders A or B and this may be done by mounting two pinions 45 and 46, Fig. 3, in intermeshing relationship with each other and the two meshing, respectively, with arcuate racks which are either made integral with the cradle members 8 and 9 or else are rigidly secured to the adjacent surfaces of these two members. These two pinions are arranged at one side of the cradle and the opposite side may be similarly guided by corresponding pinions 47 and 48, respectively. Preferably the former is mounted on a shaft 50 which may extend through the adjacent trunnion 2 and have another pinion 51, Fig. 5, mounted on its inner end where it runs on the rack 41.

At the opposite side of the body 1 parts corresponding to those just described may be provided to guide the carriage B, and like parts are designated by the same, but primed, numerals. As shown in Fig. 5 the shaft 50' is divided into two sections so that, if desired, brake mechanisms 52 and 53 like that shown at 43 may be arranged to engage and clamp both sections, the two being operated by gear connections with a common shaft 54 equipped with a hand wheel 55. Thus by operating this single hand wheel, both the gun holders or cradles and the cylindrical body 1 may be locked against rotative movement. A similar locking mechanism for the shaft 27 may be provided, if desired, and arranged to be operated by the hand wheel 72. It is not usually necessary, however. Thus either train or elevation can be locked separately by their respective brakes, or both can be locked simultaneously by the hand wheel 55.

Considerable of the weight of the parts is carried by a cylinder 56, Fig. 4, supported centrally in the post 30 on an anti-friction thrust bearing 57. Arms a—a, Fig. 4, extending upwardly from the upper end of the cylinder 56 support the opposite ends of the shaft 23 on which the pinions 22—22 are mounted, these pinions, as above explained, meshing with the sectors 21—21 that adjust the pivot shaft 5 around its axis. An annular cushioning member 58 set into the top of the cylinder 56 supports a plate 60 carrying a pedestal 61, Fig. 8, in the upper end of which the shaft 26 is mounted for rotation. Also, lugs or arms b—b extending inwardly from the trunnion supports 2—2 and rigid with them rest on the plate 60 so that these members and the parts which they carry are all mounted on a cushioned support which is itself supported on anti-friction bearings.

Additional cushioning means for the parts subjected to recoil are shown in Figs. 9, 10 and 11. In Figs. 9 and 10 it will be observed that the gun seat 14', which is also shown in Fig. 2, is interlocked with the overlapped end portions of the arms 11' through a cushioning material 62 consisting in this case, of stranded rubber which isolates the member 14' both vertically and laterally from the supports 11'. The same construction, of course, is provided for the other seat 14. Also, the cross pieces 63 and 63', Fig. 2, include cushioning material, as best shown in Fig. 11. That is, each of these cross pieces consists of a shell interlocked with a core or body 64 through the medium of rubber or other cushioning material 65. Thus the transmission of recoil of the guns to the supporting structure and to those parts that must be gripped by the gunner is minimized, with a corresponding reduction in wear and tear on both.

This cushioning effect may be carried even further, as shown in Figs. 3 and 7, where the outer trunnion supports 3 and 4 are resiliently joined to the extensions which connect them with the inner trunnion supports 2—2. As illustrated in the figures just mentioned, the lower end of the trunnion support 4 is provided with parallel arms c—c which slide over the extension d of the left-hand trunnion support 2, Fig. 3, and these parts are spaced by intervening layers of cushioning material 66. A bolt 67, Fig. 3, prevents any outward movement of the trunnion support 4 away from its companion trunnion support 2. A similar construction is provided to cooperate with the right-hand trunnion support 3.

Front and rear sights 68 and 70, Figs. 1, 3 and 12, may be mounted on the pivot shaft 5, and the central portion of this member and adjacent portions of the operating mechanism for it may be enclosed in a hood 71.

In assembling this mechanism it will usually be found most convenient to start with the base members, including the central post 30. Next the cylinder 59 is placed in its socket in said member, the cushioning member 58 and the plate 60 are installed, together with the pinions 22—22 and their shaft 23, and then the central pivot shaft 5 is placed in position. Thereafter the two sections of the body 1, each with its trunnion support 2 secured rigidly thereto, either by being made integral therewith or by being previously assembled, are slipped over the opposite ends of the shaft 5, and the overlapped sections of the joints 73—73, Fig. 5, are pinned, bolted, or otherwise secured together. The bearing member 34 also is made in two sections like the body 1 and these sections are secured together by joints similar to those shown at 73. The other assembling operations will be obvious from the nature of the construction.

The same general organization above described can be embodied with minor modifications in a single gun design as illustrated, for example, in Figs. 13 to 18, inclusive. In these views parts corresponding to those shown in Figs. 1 to 12, inclusive, are designated by the same but double-primed reference characters in order to simplify the description.

In this construction the cradle or gun holder 13" is supported on two pivots 6" and 7" in essentially the same manner that either holder is supported in the construction above described. Also, the cradle is underslung in the same manner as that previously explained so as to make the center line of the gun substantially intersect the pivotal axis of the holder; and the same cushioning arrangement is provided to minimize the effects of recoil. Likewise the parts a" and b" perform the same functions here that are performed by the parts a—a and b—b, respectively, in the above mentioned construction.

Here, however, the cradle is additionally supported or stabilized at opposite sides of the mount on two gear sectors 9", as best shown in Figs. 13, 14 and 15, and both are steadied on pinions 47". One of these, namely, that at the left-hand side, Figs. 15 and 16, of the frame, is mounted on a bushing 59", with which is associated a brake mechanism arranged to be operated by the hand wheel 55" to lock the cradle to the frame.

Adjustment of the gun for elevation is accomplished by mounting gear segments 21" on the rock shafts 6" and 7" at opposite sides of the cradle shown in Figs. 15 and 16 and arranging pinions 24"—24" to mesh, respectively, with them, these pinions being supported on a shaft 27" equipped with a hand wheel 28" and also with a brake mechanism 72" for clamping it in a stationary position.

The trunnion supports 3" and 4" are supported on the body 30" in the same manner as in the construction above described for rotation around a vertical axis, and training adjustment of the gun is produced, as before, simply by swinging the gun by hand, but a pinion 40", Fig. 16, is provided on a shaft 33" to which the hand wheel 37" is fastened so that this adjustment can be made through the hand wheel, if desired, and, in any event, the latter can be locked by a brake 53", Fig. 15.

Instead of the pedestal construction used in the arrangement illustrated in Figs. 1 to 12, the base may be made in the form of a tripod including legs 75 adjustable for length, as shown in Fig. 15, these legs being connected with the brackets 33" by a special pivot joint best illustrated in Fig. 18. In this joint the upper end of the leg is made in the form of a disk 76, Fig. 18, and fits in a slot formed in a part 77 integral with, or rigidly secured to, the part 33", these two parts 76 and 77 being pivotally connected together by a central shaft or rod 78 having an integral head 80. In addition, this head carries a circular series of pins 81 adapted to enter registering holes formed through the parts 76 and 77. The pins are equally spaced apart circumferentially and the pivot shaft 78 is made of such length that all the pins can be withdrawn and the leg turned into a different angular relationship to the part 77, after which the pins then are re-inserted, as a group, to lock the leg in a new position. The outer end of the pivot 78 is screw-threaded to receive a nut 82 which acts as a stop to prevent the shaft from being completely withdrawn when it is merely desired to adjust the leg. Preferably, also, a handle 83 is made rigid with the head 80 to assist in operating this device. By numbering the different holes in both the upper end of each leg, and also in the part 77, it is a simple matter to make the same adjustment in all three legs. The length of each leg can be adjusted by turning the sleeve 84 which has a right and left-screw-threaded connection with the two sections of the leg.

The invention thus provides a gun mount in which the objectionable effects of recoil, both on the gunner and also on the gun mount itself, are materially reduced, and in which the relationship of the gun to its supporting mechanism is such as to minimize the effect of recoil on aiming the gun. The cushioning means is so distributed as to isolate the gun holders from the central supporting and operating mechanism as well as from the base and, in fact, to isolate them in all directions from the main supporting parts which are in direct metal-to-metal contact with each other. In addition, it should be observed that the holders in the twin construction illustrated in Figs. 1 to 12 are capable of swinging through a range of approximately 180°. This advantage is obtained by mounting the guns in positions offset outwardly away from the base, reducing the dimensions of the connections between the pedestals 3 and 4 and the body 1 to a minimum and locating these connections under and widely spaced from the pivotal supports.

For the cushioning inserts, and the like, used in various locations in the gun mount above described, a considerable variety of plastic compositions are available. While natural rubber is hardly suitable in most places because of its susceptibility to the action of oils, a number of the synthetic rubbers, such as neoprene and thiokol, are not open to this objection. Also, some of the other synthetics which are not regarded as artificial rubbers, nevertheless have cushioning properties suitable for use in isolating some of these metal parts from each other. Koroseal is one example. These may be compounded with reinforcing fillers to give them the desired degree of hardness and resiliency or, in some cases, they may be used as adhesives in combining fabrics into laminated structures which have sufficient cushioning properties for the uses here proposed of them.

In this connection it may also be pointed out that the end sections only of the shaft 5 are cushioned in some such manner as that employed for the members 6 and 7, and the middle section of this shaft is made solid, this section having end portions shaped to serve as core sections for the sleeves which are mounted on them with cushioning material interposed between the sleeves and the cores.

It will be evident that the essential features of the invention may be embodied in other forms than that shown without departing from the spirt and scope of the invention.

Having thus described our invention, what we desire to claim as new is:

In a gun mount, the combination of a pair of cradle-like gun holders, each providing an underslung support for a gun, means supporting said holders for elevating adjustment of the guns about a common axis, the gun supporting surfaces of each holder being so positioned with reference to said axis that the axis of the gun mounted in it will substantially intersect said pivotal axis, said supporting means for the holders including a cylindrical body mounted on an upright stationary post for rotary adjustment around the axis of said post, a middle and two side trunnion supports rigid with said cylindrical body, a rock shaft on which said holders are mounted, said rock shaft being supported in all three of said trunnion supports, with each of said holders mounted between the middle trunnion supports and one of the side trunnion supports but in an underslung relationship to the rock shaft, the rock shaft including cushioning elements built into it and serving to isolate the holders from said trunnion supports, additional cushioning means isolating said side trunnion supports from said cylindrical body, and gear mechanism mounted between said holders for adjusting them simultaneously for elevation, said gear mechanism including a manually operable element for making said elevation adjustment.

SYDNEY T. FARRELL.
FREDERICK L. FARRELL.

REFERENCES CITED

The following references are of record in the file of this patent:

UNITED STATES PATENTS

| Number | Name | Date |
|---|---|---|
| 168,346 | Schultz | Oct. 5, 1875 |
| 934,513 | Faber | Sept. 1, 1909 |
| 1,190,356 | Yost | July 11, 1916 |
| 1,471,398 | Inglis | Oct. 23, 1923 |
| 1,790,212 | Green | Jan. 27, 1931 |
| 2,346,692 | Lucht | Feb. 15, 1937 |

FOREIGN PATENTS

| Number | Country | Date |
|---|---|---|
| 25,695 | Germany | Jan. 28, 1884 |
| 155,807 | Switzerland | Sept. 16, 1932 |
| 278,356 | Great Britain | June 21, 1928 |
| 483,847 | Great Britain | Feb. 15, 1937 |
| 673,342 | France | Oct. 7, 1929 |
| 695,313 | Germany | Aug. 22, 1940 |
| 764,689 | France | Mar. 12, 1934 |